US005522660A

United States Patent [19]
O'Dougherty et al.

[11] Patent Number: 5,522,660
[45] Date of Patent: Jun. 4, 1996

[54] APPARATUS FOR BLENDING AND CONTROLLING THE CONCENTRATION OF A LIQUID CHEMICAL IN A DILUENT LIQUID

[75] Inventors: Kevin T. O'Dougherty, Minneapolis; Alden W. Sandquist, Watertown, both of Minn.

[73] Assignee: FSI International, Inc., Chaska, Minn.

[21] Appl. No.: 355,671

[22] Filed: Dec. 14, 1994

[51] Int. Cl.$^6$ .............................. B01F 15/02; G05D 11/08
[52] U.S. Cl. ...................... 366/136; 366/140; 366/152.1; 366/160.2; 137/93
[58] Field of Search .................... 366/132, 134, 366/136, 137, 151.1, 152.1, 159.1, 160.1, 160.2, 160.5, 162.1, 140; 137/3, 93, 563

[56] References Cited

U.S. PATENT DOCUMENTS

| | | | |
|---|---|---|---|
| 3,273,580 | 9/1966 | Ladd | 137/93 |
| 3,653,640 | 4/1972 | deHaas | 366/132 |
| 4,091,834 | 5/1978 | Frigato | 137/93 |
| 4,121,767 | 10/1978 | Jensen | 137/93 X |
| 4,403,866 | 9/1983 | Falcoff et al. | 366/132 |
| 4,571,088 | 1/1986 | Frensch et al. | 366/136 |
| 4,584,002 | 4/1986 | Cox et al. | 55/257 |
| 4,621,927 | 11/1986 | Hiroi | 366/132 |
| 4,844,620 | 7/1989 | Lissant et al. | 366/136 |
| 4,857,355 | 8/1989 | Gregg | 426/590 |
| 4,863,277 | 9/1989 | Neal et al. | 366/137 |
| 4,977,929 | 12/1990 | Chinnock et al. | 137/863 |
| 5,002,086 | 3/1991 | Linder et al. | 137/312 |
| 5,334,496 | 8/1994 | Pond et al. | 430/569 |
| 5,348,389 | 9/1994 | Jonsson et al. | 366/136 |
| 5,348,390 | 9/1994 | Schertenleib | 366/136 |

FOREIGN PATENT DOCUMENTS

| | | | |
|---|---|---|---|
| 1300315 | 12/1989 | Japan | 137/392 |
| 857943 | 8/1981 | U.S.S.R. | 137/3 |
| 2094033 | 9/1982 | United Kingdom | 137/3 |

OTHER PUBLICATIONS

Sensor Instruments For Conductivity Measurement And Control, Great Lakes Instruments, 6 pages–(Admitted Prior Art.).

Great Lakes Instruments—Operating Instruction Manual, Model 3600–Series Electrodeless Conductivity Sensors, Manual No. 201, Revision 2–891, 16 pages (Admitted Prior Art.).

FSI International, Inc. Exhibit 1—Schematic Drawing (Admitted Prior Art.).

FSI International, Inc. Exhibit 2—Schematic Drawing (Admitted Prior Art.).

*Primary Examiner*—Charles E. Cooley
*Attorney, Agent, or Firm*—Palmatier, Sjoquist & Helget

[57] ABSTRACT

Apparatus blending a diluent liquid, i.e., DI water, with a chemical concentrate, a flow duct and mixing tank forming a closed loop for mixing; a pair of flow duct portions each having a conductivity sensor inductively sensing chemical concentration in the blended liquid; a comparator for comparing the outputs of said parallel sensors; a single pump circulating blended liquid around the closed loop and drawing chemical concentrate from a source through an adding valve which cycles open and closed under control of the concentration sensors; the pump also propelling the blended liquid from the closed loop to the point of use, and conductivity sensors existing in individual housings through which the blended liquid flows upwardly to minimize any collection of bubbles adjacent the sensors.

6 Claims, 5 Drawing Sheets

APPARATUS FOR BLENDING AND CONTROLLING THE CONCENTRATION OF A LIQUID CHEMICAL IN A DILUENT LIQUID

This invention relates to apparatus for blending liquid chemicals with a diluent liquid, such as water, and establishing a predetermined blend between the liquid chemical and the diluent liquid.

BACKGROUND OF THE INVENTION

Liquid chemicals and water have been blended in predetermined concentrations previously through the use of sensors of both the type which actually engage the liquid, and other electrodeless-type sensors placed in the flow line or container wherein the blended liquid is found.

The use of blended liquid becomes extremely important in industrial applications, such as in the processing of semiconductor wafers, wherein exactly the correct blend of chemical and diluent liquid must be achieved. A wafer processing tool using the blended liquid may cause a substantial amount of waste of semiconductor wafers if the blended liquid does not have the correct concentration of chemical and accordingly, it is desirable that the accuracy of the chemical concentration in the blended liquid be extremely accurate.

Closed loop mixing and blended systems have been known in the past, wherein electrodeless-type sensors have been placed in a storage and mixing tank in some instances, and in other instances, have been placed in a flow duct through which the blended liquid is circulated. In some instances, such electrodeless-type sensors have been placed in series with each other along the flow duct carrying the blended liquid in an attempt to obtain the desired accuracy of measuring the chemical concentration in the blended liquid; however, such electrodeless-type sensors placed in series along the flow duct create such turbulence in the flowing blended liquid that results in measuring the conductivity, and therefore the chemical concentration in the blended liquid, have less than the desired accuracy.

Moreover, the concentrated liquid chemical has been previously pumped and propelled through a line for mixing with the diluent liquid in such a manner that accurate quantities of chemical concentrate cannot be accurately dispensed.

SUMMARY OF THE INVENTION

An object of the invention is to provide apparatus for mixing precise quantities of concentrated liquid chemical with a diluent liquid, such as deionized (DI) water, in an arranged whereby a blended liquid, including a predetermined proportion of chemical concentrate, may be supplied to a remote point of use.

A feature of the invention is a large storage and mixing container or barrel into which a predetermined amount of diluent liquid or water is placed. A flow duct is arranged in a closed loop to draw liquid from the container and return the liquid to the container. A single pump is connected into the flow duct to draw liquid from the container and circulate the liquid throughout the loop. A source of liquid chemical is connected into the duct adjacent the suction side of the pump by a chemical adding valve which continuously allows liquid flow in the flow duct and around the closed loop, and which adding valve may be cycled open and closed to connect the chemical source into the flow duct so as to cause the pump to draw chemical into the flow duct along with and mixed with the flowing diluent liquid to create the desired blended liquid. Flow of mixed diluent liquid and chemical, or blended liquid, is continuous around the closed loop and mixing continues in the flow duct and mixing container.

The chemical concentration measuring device is maintained in the flow duct between the mixing container and the chemical adding valve, and the blended liquid of mixed chemical concentrate and diluent liquid flow continuously through the concentration measuring device which continuously monitors the chemical concentration.

A feature of the invention is the chemical concentration device which comprises a pair of concentration sensors in parallel portions of the flow duct between which the circulating blended liquid flow is divided. The concentration sensors measure the conductivity of the blended liquid and produce a concentration indication thereof. The two concentration indications, which may be very nearly the same within a very small margin of error, are first compared to indicate that both of the concentration sensors are functioning with uniformity. In the event that the concentration indications from the two sensors vary outside of a predetermined range, the entire blending system is stopped so that the determination can be made as to the nature of the problem in the system. On the other hand, if the concentration indications are the same, or within a very close range, the adding valve is cycled, opening the chemical flow line momentarily in each cycle, to add chemical concentrate into the blended liquid as to increase the chemical concentration in the blended liquid. As the indications of chemical concentrate in the blended liquid increase, as to indicate a higher concentration chemical in the blended liquid, the time during which the chemical adding valve remains open in its cycle of operation is reduced so that the chemical concentration in the blended liquid smoothly approaches, and then ultimately achieves, the desired chemical concentration.

Another feature is the mounting of each of the sensors, i.e. coils, embedded in a plastic sheath in a plastic housing. Both the plastic sheath for the coils and the plastic housing are made of a plastic which is resistant to the deteriorating effects of highly corrosive liquids; and such plastics have smooth surfaces upon which bubbles may tend to collect. The housings are arranged with flow inlets at the bottom and flow outlets at the top, requiring upward flow of the blended liquid through the housing and past the concentration sensors, thereby minimizing any collection of bubbles that might exist in the flowing blended liquid on any of the surfaces of the housing or of the plastic sheath in which the sensor coils are embedded. Such bubbles that have been experienced in prior chemical blending apparatus tend to decrease the conductivity of the blended liquid being measured because the bubbles, although some of them are microscopic, do not conduct electricity and accordingly, the measurement of the chemical concentration in the blended liquid is inaccurate.

DETAILED SPECIFICATION

Some of the chemical concentrates utilized in the semiconductor industry for processing semiconductor wafers are identified in TABLE 1 below, which also sets forth the blend of the chemical in water as the chemical is oftentimes supplied for use.

TABLE 1

| Chemical Name | Symbol | Percentage Concentrate in water |
| --- | --- | --- |
| Hydrofluoric Acid | HF | 49% |
| Acetic Acid | HAC | 98% |
| Nitric Acid | $HNO_3$ | 71% |
| Phosphoric Acid | $H_3PO_4$ | 80% |
| Potassium Hydroxide | KOH | 30% |
| Tetramethyl ammonium Hydroxide | TMAH | 25% |
| Hydrochloric Acid | HCl | 37% |
| HF and Ammonium Fluoride mixtures | BOE's | — |
| Ammonium Hydroxide | $NH_4OH$ | 28–30% |
| Sulfuric Acid | | |
| Carbonic Acid | | |

To the concentrates listed in TABLE 1, deionized water is oftentimes added in the various ratios of ten parts DI to one part of chemical concentrate, to as much as one hundred parts of DI water to one part of chemical concentrate. For instance, hydrofluoric acid is regularly supplied in a 49% solution, and that is diluted to a 4.9% HF solution to 95.1% of water; and may be diluted substantially more as to 0.49% of chemical concentrate to 99.51% water.

Similarly, TMAH may be diluted to 2.38% by weight concentrate to 97.62% water, and in other instances, may be further diluted.

Accuracy in maintaining the selected blend of chemical concentrate in the diluent liquid, or water, is extremely important. The present apparatus maintains the concentration of the chemical concentrate in the blended liquid at the mean within a lower three sigma limit below the mean, or an upper three sigma limit above the mean. For instance, for a 4.9% HF by weight concentration in the blended liquid including DI water, an upper three sigma limit is 4.9%x (1.005) or 4.9245 which represents the upper three sigma weight percent limit; and the lower three sigma limit is 4.9%x (1–0.005) or 4.8755 which represents the lower three sigma weight percent limit. Other of the chemicals identified in TABLE 1 are also blended in the same way, as are additional chemicals of comparable concentrations.

Figure 1:
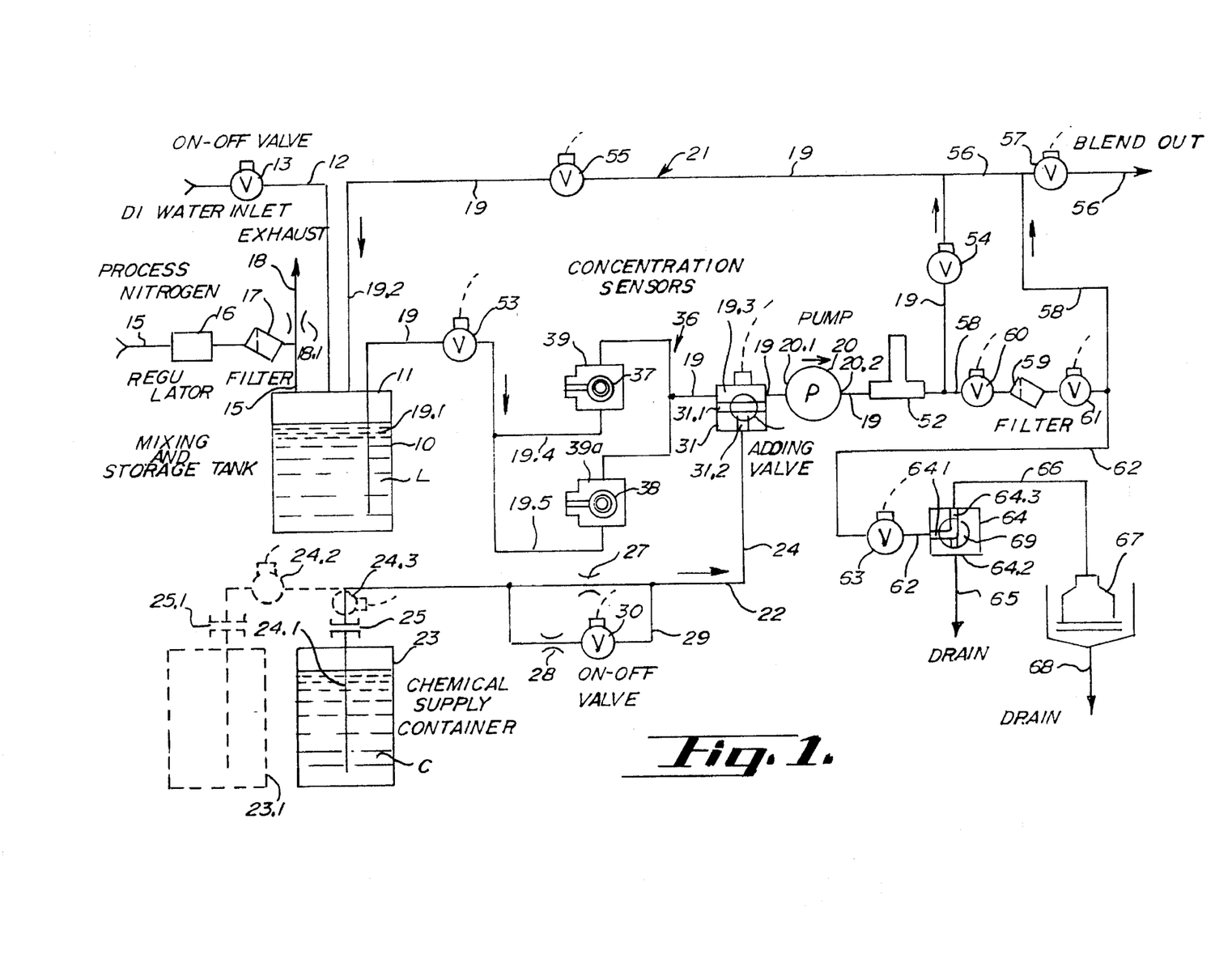
FIG. 1 is a schematic diagram of the blending apparatus for adding a mixing chemical concentrate into a diluent liquid such as DI water.

The blending apparatus is indicated schematically in FIG. 1, wherein a mixing and storage tank 10, preferably of a plastic resistant to the deteriorating effects of corrosive chemicals, such as Teflon® PFA (perfluoroalkoxy) or PVDF has a closed and sealed lid 11 and is connected to a supply line 12 for supplying DI water into the tank. A valve 13 in the supply line 12 controls the flow of the diluent liquid into the tank. Valve 13 is operated by the control system 14 described further in connection with FIG. 4.

Process nitrogen is supplied through a supply line 15 into the top of the tank 10, through a regulator 16, and a filter 17. An exhaust line 18, with an orifice 18.1 therein, connects to line 15 adjacent the tank 10, preventing the gas pressure in the tank from becoming excessive. Tank 10 may have a size in the range of approximately thirty gallons.

A flow duct 19 resistant to the deteriorating effects of corrosive chemicals has a liquid receiving end portion 19.1 connected in the container 10 and extending down into the liquid contained therein-; and the duct 19 also has a discharge end portion 19.2 returning liquid from the duct 19 into the container 10.

A pump 20 is connected into the flow duct 19 and functions to draw the liquid, i.e., blended liquid L, from the tank 10 and circulate the blended liquid through the flow duct 19 and back to the container 10. The combination of the flow duct 19 and the container 10 forms a closed loop, indicated in general by the numeral 21, around which the blended liquid continuously flows.

A source of liquid chemical is indicated in general by numeral 22 and comprises a chemical supply container 23 and a chemical flow line 24. The container 23 may comprise a fifty-five gallon drum or similar tank in which the liquid chemical C is supplied from the original manufacturer thereof. The container 23 may be attached to and disconnected from the flow line 24 by a suitable coupling 25 so that a portion 24.1 of the flow line extends into the lower portion of the container C from which the liquid chemical concentrate C may be drawn.

A second supply container 23.1 may be connected into the chemical flow line 24 by a valve 24.2 and coupling 25.1. A second on-off valve 24.3 will be connected into flow line 24 adjacent coupling 25 if the second container is used. Operation of the valves may be automatic in switching between containers.

An orifice 26 may be provided in the flow line 24 for controlling the flow of liquid chemical therethrough. A second pair of orifices 27 and 28 are provided for closely regulating the flow rate through the flow line 24. The orifice 28 is in a shunt line 29 which also contains a valve 30 for bypassing and supplementing the flow through the orifice 27. When the valve 30 is opened, the flow of chemical through the flow line 24 may be increased by a factor of 10 (or some other factor according to the specific specifications of the apparatus) so that a different range of chemical concentration can be added to the diluent liquid to which the chemical concentrate is being added.

Figure 3:
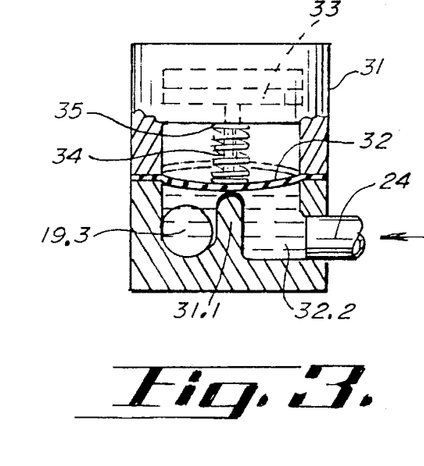
FIG. 3 is a schematic drawing illustrating the chemical adding valve.

A chemical adding valve 31 connects the chemical flow line 24 directly into the flow duct 19 through which the blended liquid circulates. The adding valve 31, of a type sometimes known as a sample valve, and illustrated schematically in FIG. 3, provides for the chemical concentrate liquid to be added directly from the flow line 24 into the duct portion 19.3 of the valve 31 which comprises an unobstructed flow-through portion of the flow duct 19. The duct portion 19.3 of the adding valve 31 extends along a weir 31.1 which separates the duct portion 19.3 from the inlet chamber 31.2 to which the flow line 24 is connected. A diaphragm 32 bears downwardly on the weir 31 to separate the inlet chamber 31.2 from the duct portion 19.3 and prevents liquid chemical concentrate from the flow line 24 from being added to the blended liquid in the duct portion 19.3. An operating device, an air piston 33, is connected by the operating stem 34 to the diaphragm 32 for lifting the diaphragm off the weir 31.1 and allowing flow of liquid chemical concentrate to flow into and mix with the blended liquid in the duct portion 19.3 and flow duct 19. A spring 35 returns the diaphragm onto the weir 31.1 to close the adding valve when the air pressure on piston 33 is released. The adding valve 31 is substantially identical to the valve illustrated and described in U.S. Pat. No. 4,977,929, modified to be operated by an air operated piston. Accordingly, there are no dead spots between the flow line 24 and flow duct 19 wherein quiescent quantities of liquid chemical concentrate may exist in an uncontrolled condition.

It is important that the adding valve 31 be located in the flow duct 19 between the suction side 20.1 of the pump 20 and the mixing and storage chamber or tank 10. The pump also has a pressure side 20.2.

A chemical concentration measuring device 36 is located in the flow duct 19 between the adding valve 31 and the mixing tank 10. The measuring device 36 comprises a pair of flow duct portions 19.4 and 19.5 which also comprise portions of the flow duct 19 and carry all of the flowing blended liquid which is circulating in the flow duct 19 and around the closed loop 21.

Figure 2:
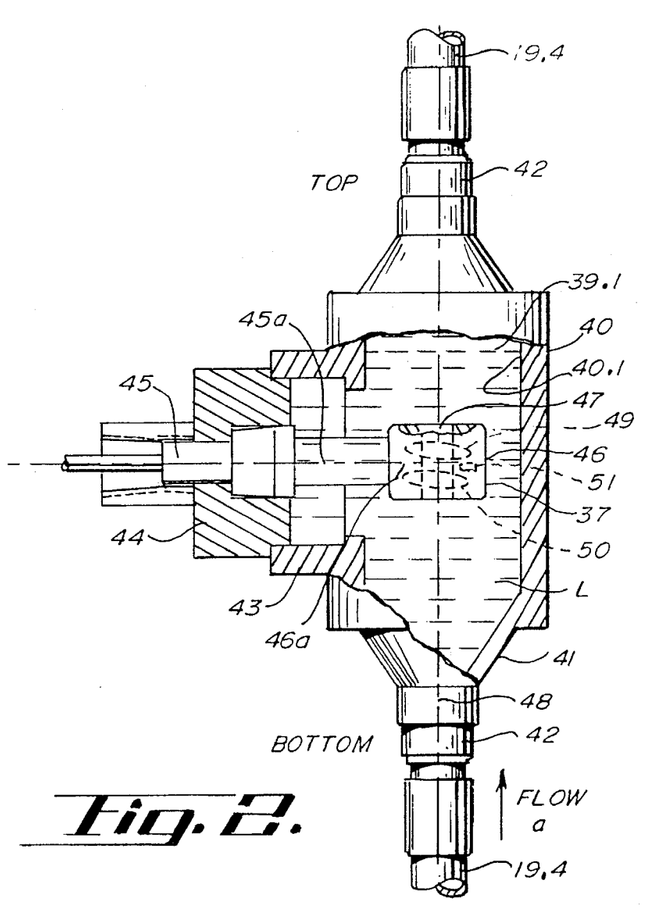
FIG. 2 is an elevation view, partly broken away for clarity of detail, and illustrating one of the chemical concentration measuring devices.

The chemical concentration measuring device 36 also comprises a pair of concentration sensors or probes 37, 38, illustrated diagrammatically in FIG. 1 and in more detail in FIG. 2, which are located in the two flow duct portions 19.4, 19.5, respectively. The two sensors 37, 38 are identical to each other and accordingly, an understanding of one of the sensors as illustrated in FIG. 2 provides an understanding for both of the sensors 37, 38.

The sensors 37, 38 are mounted and confined within flow housings 39, 39a, respectively, which are connected into and form portions of the duct portions 19.4, 19.5, respectively. The flow housings 39, 39a are identical to each other and an understanding of one will suffice for an understanding of both, and the flow housing 39 is illustrated in FIG. 2.

The flow housing 39 is formed of plastic resistant to the deteriorating effects of corrosive chemicals, and is preferably molded of Teflon® PFA (perfluoroalkoxy) or PVDF. The housing 39 has a generally cylindrical outer wall 40, and tapered end walls 41 providing a fitting 42 for connection to the adjacent flow duct portions 19.4. The nature of the plastic in the housing 39, and particularly in the cylindrical wall 40 thereof, provides smooth inner surfaces 40.1 upon which bubbles may tend to collect, but the smooth continuous flowing blended liquid moving upwardly through the open interior 39.1 of the housing, as indicated by arrow a, will minimize or prevent collection of bubbles on such surfaces.

The flow housing 39 has a T-opening 43 in which a mounting plug 44 is affixed, as by welding, for mounting the stem portion 45 of the concentration sensor 37 confined within the housing.

The concentration sensor or probe 37 has a sensing head 46 on the inner end of the stem 45; and the head 46 is annular in shape, defining a central opening 47 which is located approximately on the centerline 48 of the housing, which is also aligned with the flow duct portions 19.4 at opposite ends of the flow housing 39. Accordingly, the blended liquid which fills the housing 39 as it flows through the housing, also flows through the center opening 47 of the sensing head 46.

The head portion 46 and the stem 45 of the sensor 37 are formed integrally of each other and are molded of a plastic which is resistant to the deteriorating effects of corrosive chemicals, such as Teflon® PFA (perfluoroalkoxy) or PVDF, and the head and stem portions 46, 45 of the sensor provide a plastic sheath for wire coils 49, 50 which are embedded in the plastic of the head 46 and surround the center opening 47 of the head. The plastic of which the head 46 and stem 45 are formed also has smooth outer surfaces 45a, 46a of the stem and head respectively and around the center opening 47 of the head, and the smooth upward flow of the blended liquid prevents or minimizes the possibility of bubbles collecting on those surfaces.

Coil 49 will be energized by a signal from the oscillator (see FIG. 4) to create an induction field around the coils. As a result of the induction field created by the AC current coil 49, a current is established in the liquid L, the magnitude of which is related directly to the conductivity and to the concentration of the chemical concentrate in the blended liquid L, and as a result, a current or responsive signal is created in the other coil 50 to provide the output from the sensor 37.

The sensor 37 (and also 38) also includes a temperature sensor 51 for providing an electrical output useful and analyzing the output from the coils 49, 50 and making a correction for temperature change.

The flow duct 19 also may contain a surge suppressor 52 adjacent the pressure side 20.2 of the pump 20. The flow duct 19 also includes a number of on-off valves resistant to the deteriorating effects of corrosive chemicals and may be constructed as illustrated and described in U.S. Pat. No. 5,002,086. Such on-off valves are all air operated. On-off valve 53 is located between the chemical concentration measuring device 36 and the liquid receiving end portion 19.1 of the flow duct; on-off valve 54 and on-off valve 55 are both in series with each other between the pressure side 20.2 of the pump and the discharging end portion 19.2 of the flow duct 19.

A blended liquid discharge line or pipe 56 is connected into the flow duct 19 between the two on-off valves 54, 55; and the discharge line 56 also contains an on-off control valve 57.

A filter line 58 is connected to the flow line between the surge suppressor 52 and the valve 54; and the filter line is also connected into the discharge pipe or line 56 adjacent the valve 57. The filter line 58 has a filter 59 therein and the filter line 58 also has a pair of on-off control valves 60, 61 on both sides of the filter 59.

A drain and sample collecting line 62 is connected to the filter line 58 between the valve 61 and the valve 57 of the discharge line 56. The drain and sample line 62 has an on-off valve 63 therein and also a two-way valve 64. The valve 64 has an inlet port 64.1, a drain port 64.2 for discharging liquid to the drain line 65, and a sample port 64.3 connected to a sample line 66 which supplies liquid into a sample bottle 67 and to a drain line 68. The sample valve 64 also has a valving element 69 alternately connecting port 64.1 with sample port 64.3 (shown) or with drain port 64.2. Accordingly, the line 62 may be alternately connected to the sample line 66 or drain line 65.

Figure 4:
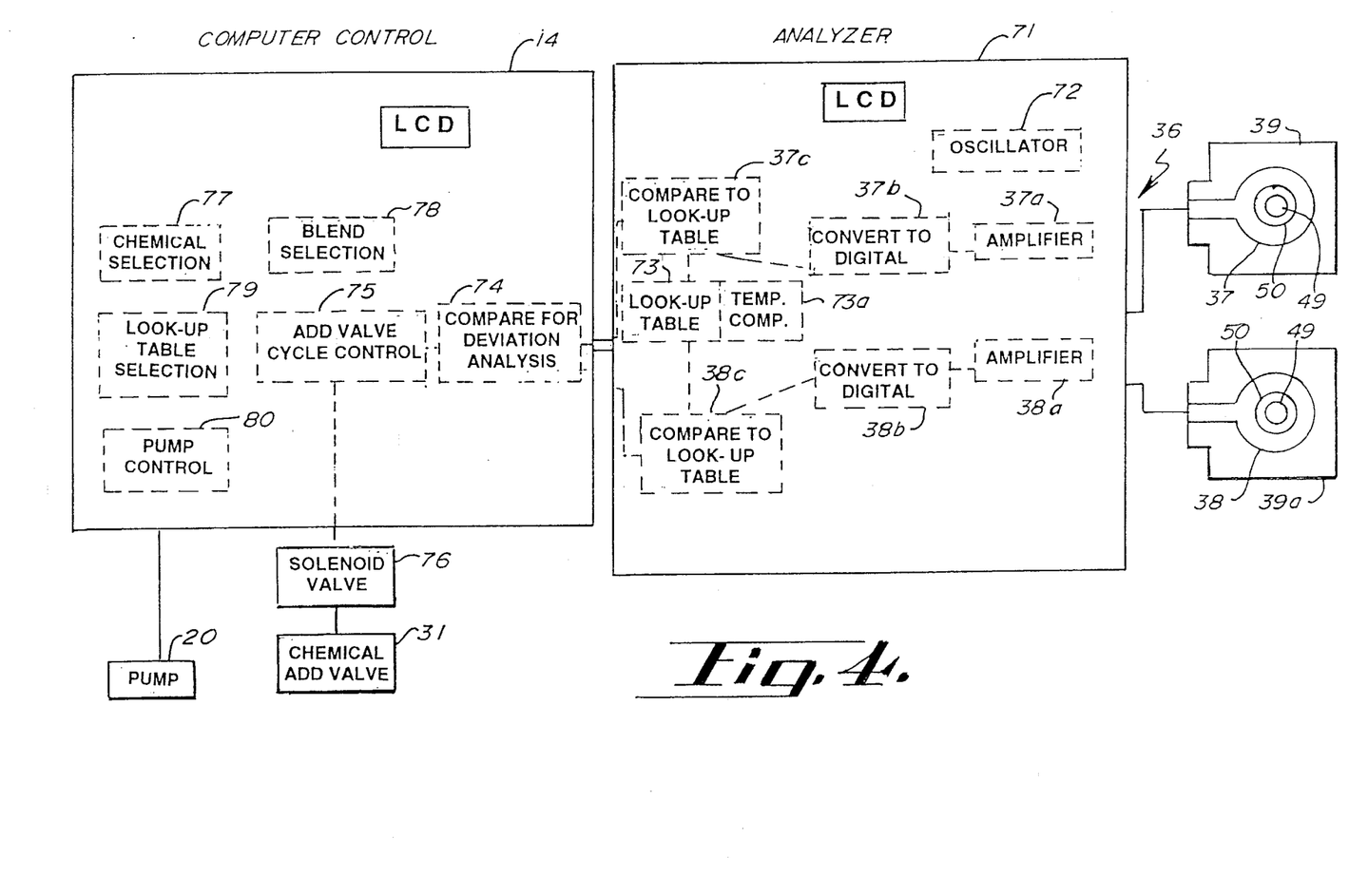
FIG. 4 is a diagrammatic drawing illustrating important aspects of the control system.
Figure 5:
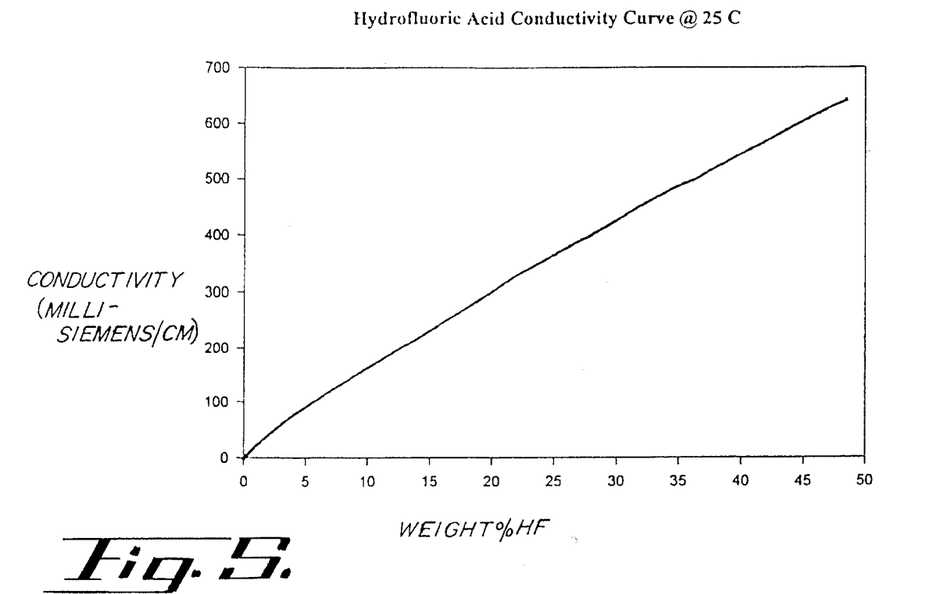
FIGS. 5–8 are conductivity curves illustrating the relation between conductivity of a blended liquid and the percentage of a chemical concentrate therein for hydrofluoric acid (FIG. 5), acetic acid (FIG. 6), nitric acid (FIG. 7), and phosphoric acid (FIG. 8).
Figure 6:
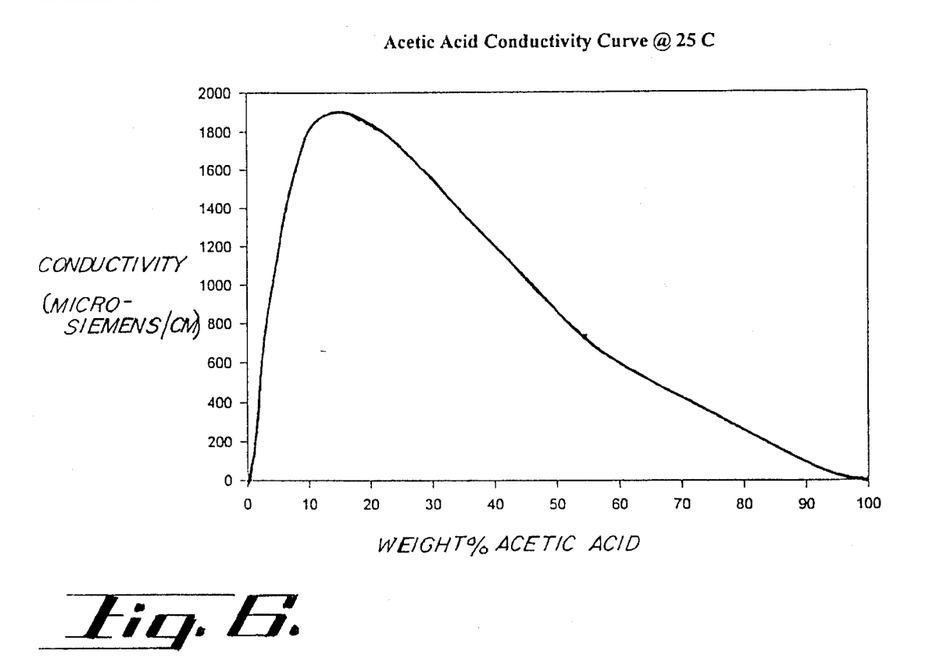
Figure 7:
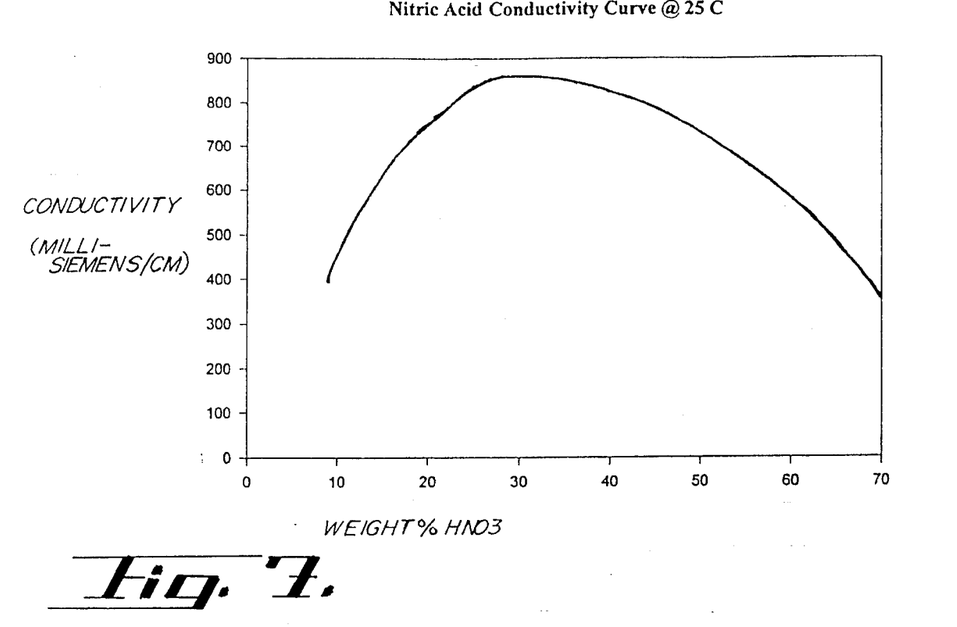
Figure 8:
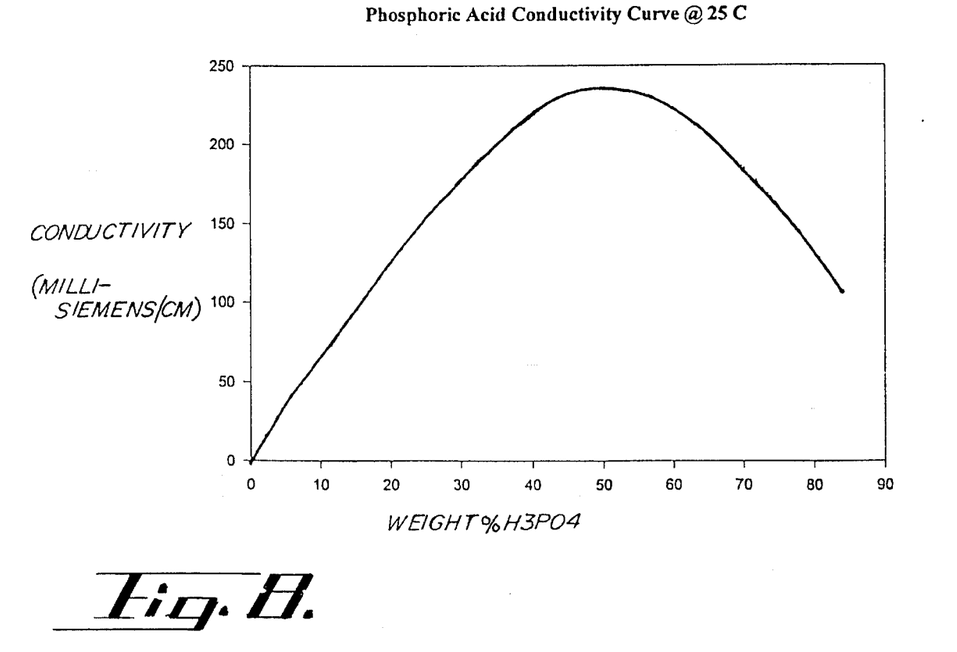

FIG. 4 shows the general operation of the chemical concentration measuring device 36. A microprocessor 71 and related circuits is associated with the two chemical concentration sensors 37, 38 of the concentration measuring device 36. An oscillator 72, associated with the microprocessor 71, supplies AC signals to the coil 49 in both of the sensors 37, 38; and the output signals or indications are then created in the other coil 50 in the sensors 37, 38. The output from the coil 50 in sensors 37, 38 are directed into amplifiers 37a and 38a of the control circuit, and these amplified signals are then converted to digital form at 37b, 38b. These digitized output signals are then compared, at 37c, 38c to information in a look-up table 73, compensated for temperature at 73a.

The output from the comparators 37c, 38c is then defined in terms of chemical concentration in the blended liquid instead of conductivity; and the outputs from the two sensors 37, 38 are then transmitted to the control computer 14 and specifically into the comparator 74 wherein the signals are compared to each other for deviation analysis. In most cases, the compared signals are identical, or nearly so, within a narrow band width, and a signal is directed to the chemical adding valve cycle control 75 for varying the time during which the chemical adding valve is open in each cycle of its operation. Solenoid air valves 76 are operated by the adding valve cycle control to similarly operate the air operated adding valve 31. Accordingly, as the concentration of chemical measured by the chemical concentration measuring device 36 senses an increased concentration of chemical in the blended liquid L, the length of time that the adding valve 31 is opened in each cycle of its operation, will be shortened. Thereby the desired blend of chemical concentration in the blended liquid is achieved progressively and smoothly without overshooting the set point. The control device 14 also provides for chemical selection at 77 and the blend selection of that chemical at 78 to accordingly select the appropriate look-up table at 79.

If, at comparator 74, it is determined that an excess deviation exists between the chemical concentration signals received from sensors 37 and 38, the pump control 80 will immediately shut down the pump 20 so that the system can be analyzed for the fault that exists.

With respect to curves illustrated in FIGS. 5–8, it will be recognized that these curves are empirically created from laboratory testings that have been conducted, and they show for various acids or chemicals an accurate indication of the percentage of the chemical concentrate in a blended liquid, i.e., acid in water, in relation to the conductivity which is measured by the conductivity sensors or probes 37, 38. Although the curves in FIGS. 5–8 show an extremely wide range of chemical concentration in the blended liquid, only portions of these curves need be programmed into the look-up tables of the microprocessor in order to function in the chemical concentration measuring device 36 of the blending apparatus.

In the blending apparatus illustrated in FIG. 1, it will be recognized that the blending apparatus, i.e., the concentration sensors 36, the adding valve and the pump, may be located remotely from the chemical supply container 23 and also remotely from the point of use to which blended liquid is ultimately supplied by discharge pipe or line 56.

The blended liquid circulating in the flow duct and around the closed loop 21 is continuously monitored by the chemical concentration measuring device 36 all during the adding of chemical and as the chemical concentration is progressively increased to achieve the desired chemical concentration in the blended liquid L. The monitoring of the chemical concentration in the blended liquid continues during discharge of the liquid and after valve 55 is closed so that the liquid being propelled to the tools or processing stations from the discharge line 56 will continue to be known as to its concentration as desired. The operation of the two concentration sensors or probes 37, 38 are compared against each other continuously, and any variation in their outputs will immediately cause the system to shut down until the system can be analyzed to determine the reason for the variance in the sensor outputs. The sensors are arranged in parallel with each other in the continuous flow duct 19 and the outputs from the sensors should be identical to each other. Moreover, if either of the sensors 37, 38 were to fail, the system would be immediately shut down for analysis.

In this blending apparatus, the final proportion of the chemical concentration to the diluent liquid is measured, independent to the initial concentration of the chemical which is being added to the diluent liquid. As set forth in TABLE 1, the chemicals or chemical concentrations are consistently mixed with water in various proportions as they come from the original manufacturer thereof, and by use of the present blending apparatus, the exact concentration of the original chemical being added is not of primary concern.

It will also be recognized that a single pump continues the circulation of the blended liquid while chemical concentrate is being added and until the level of chemical concentration in the blended liquid achieves the desired concentration. The single pump draws liquid chemical from the supply container 23. The same pump P will propel the blended liquid out of the blending apparatus and to the point of use through the discharge line 56, particularly after valve 55 has been closed. As the blended liquid is being discharged to the point of use, the monitoring continues by the chemical concentration measuring device 36. The single pump 20 propels the liquid to the point of use, through the discharge line 56 as well as draws the chemical from the tank 10.

As the chemical concentration measuring device continues to operate, the flow of the blended liquid is in and upward direction through the housings 39, 39a and around the two sensors 37, 38, and the flow through the housings and around the sensors is smooth, and without significant turbulence. Because of the smooth upward flow of blended liquid through the housings 39, 39a, and through and around the heads 46, bubbles, which would change the conductivity measure of the liquid, are not likely to adhere to any surfaces of the housings 39, 39a or sensors 46, and therefore will not affect the measure of the conductivity and concentration of the chemical in the blended liquid.

The chemical concentration measuring device may also be used after the supply of blended liquid L has been partly used or exhausted from the tank 10 and when the blending apparatus is being cleaned for use with different chemicals. The circulating liquid in the closed loop 21 is continuously monitored, especially while any of the previously blended liquid is being exhausted down the drain line 62; and when the DI water circulating in the closed loop 21 is measured to be clear of chemical, then a new batch of the chemical concentrate can be added to the liquid to be circulated. If the supply of blended liquid is only being supplemented, a quantity of DI water may be added, and then the chemical concentration may be increased as described above.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

We claim:

1. Apparatus for producing a blended liquid containing a predetermined concentration of liquid chemical in a diluent liquid, comprising a storage and mixing container to receive the diluent liquid and to store such blended liquid, a flow duct comprising a receiving end portion connected with said mixing container to receive blended liquid therefrom and a discharging end portion discharging blended liquid into the container, the container and flow duct comprising a closed loop around which liquid circulates, a circulation pump in the flow duct and drawing blended liquid from the mixing container and continuously circulating blended liquid through the flow duct and around the closed loop and thereby continuously mixing the flowing blended liquid, the pump having a suction side and a pressure side, a source of the liquid chemical for mixing with the diluent liquid and comprising a chemical flow line through which the liquid chemical flows, a chemical adding valve connected in the flow duct between the suction side of the pump and the mixing container, the chemical adding valve continuously allowing blended liquid flow through the adding valve and along the flow duct and around the closed loop for continuously mixing the flowing blended liquid, the chemical adding valve also being connected to said chemical flow line and being operable to alternately open and close between the chemical flow line and the flow duct and thereby allow the liquid chemical to be drawn by the pump into the flow duct and be continuously mixed with the blended liquid therein and change concentration of the liquid chemical in the blended liquid in the flow duct when the valve has been opened, a blended liquid discharge pipe connected into the flow duct between the pressure side of the pump and the discharging end portion of the flow duct, the discharge pipe also comprising a control valve therein to regulate discharging flow of the blended liquid from the closed loop, and a chemical concentration measuring device in the flow duct between the chemical adding valve and the mixing container and continuously monitoring the concentration of the flowing blended liquid in the flow duct, said concentration measuring device comprising a pair of flow duct portions connected in parallel relation to each other and carrying the flowing blended liquid, the chemical concentration measuring device comprising a pair of chemical concentration sensors each in a respective one of said flow duct portions, each of said concentration sensors producing an output indicating the concentration of the liquid chemical in the blended liquid flowing in the respective flow duct portion, and said concentration measuring device also comprising means for comparing the outputs of said concentration sensors for uniformity and said means also directing a signal to a chemical adding valve control for controlling the operation of said chemical adding valve in response to the chemical concentration sensed in the blended liquid to reduce flow of the liquid chemical into the flow duct as the chemical concentration in the blended liquid in the flow duct progressively increases and then stop the flow of the liquid chemical into the flow duct when the blended liquid achieves a predetermined concentration.

2. The apparatus according to claim 1 wherein each of said parallel flow duct portions comprises a flow-through plastic housing in which one of said chemical concentration sensors is mounted, each of said sensors comprising signal carrying coils embedded in a sheath of plastic, the plastic of the housing and of the sheath being resistant to the deteriorating effect of corrosive chemicals, the coils being core coupled together by the blended liquid flowing through the housing and around the embedded coils and producing an output indicating the concentration of the chemical in the flowing blended liquid in accordance with the degree of coupling provided between the coil by the liquid.

3. The apparatus according to claim 2 wherein said flow-through plastic housing comprises an inlet and an outlet for the flowing blended liquid, the inlet being located below the embedded coils and the outlet being located above the embedded coils whereby the smooth flow of blended liquid is in an upward direction to minimize collecting bubbles from the liquid on smooth surfaces of the housing and of the plastic sheath embedding the coils.

4. The apparatus according to claim 3 wherein the housing in each of said parallel flow duct portions has said inlet and said outlet arranged in alignment with each other, the housing having a generally cylindrical wall located between said inlet and said outlet, the chemical concentration sensor in said housing being located in alignment with said inlet and said outlet and said sensor being annular in shape, thereby defining a center opening through which blended liquid may flow, said center opening also being located in alignment between said inlet and said outlet.

5. The apparatus according to claim 1 and wherein said means for comparing the outputs of said sensors for uniformity generates a control signal when uniformity of said outputs is lacking and a pump control responds to said control signal and causes the pump to stop operating as to prevent further flow of the blended chemical around the closed loop or out the discharge pipe.

6. The apparatus according to claim 1 wherein said circulation pump and the suction side thereof drawing the blended liquid through the chemical adding valve and drawing the liquid chemical through the chemical flow line and from a container of liquid chemical connected with said chemical flow line.

* * * * *